US009102127B2

(12) United States Patent  
Berkowitz et al.

(10) Patent No.: US 9,102,127 B2  
(45) Date of Patent: Aug. 11, 2015

(54) WATERPROOF LAMINATED MAT

(75) Inventors: Daniel Berkowitz, Devon, PA (US); Eui Teck Hong, Hong Kong (CN)

(73) Assignee: Daniel Berkowitz, West Chester, PA (US)

( * ) Notice: Subject to any disclaimer, the term of this patent is extended or adjusted under 35 U.S.C. 154(b) by 546 days.

(21) Appl. No.: 10/306,765

(22) Filed: Nov. 27, 2002

(65) Prior Publication Data

US 2003/0219566 A1    Nov. 27, 2003

Related U.S. Application Data

(60) Provisional application No. 60/333,471, filed on Nov. 28, 2001.

(51) Int. Cl.
*B32B 3/06* (2006.01)
*B32B 27/12* (2006.01)
*A47G 9/06* (2006.01)

(52) U.S. Cl.
CPC ............... *B32B 27/12* (2013.01); *A47G 9/062* (2013.01); *Y10T 428/24017* (2015.01); *Y10T 428/24033* (2015.01); *Y10T 428/24231* (2015.01)

(58) Field of Classification Search
CPC .......... B32B 27/12; B32B 3/06; A47G 9/062; Y10T 428/24231; Y10T 428/24033; Y10T 428/24017
USPC ............. 428/121–130, 192, 53, 102; 442/86; 112/423, 426; 5/500, 417–420
See application file for complete search history.

(56) References Cited

U.S. PATENT DOCUMENTS

| | | | | | |
|---|---|---|---|---|---|
| 139,378 | A | * | 5/1873 | Earle | 112/147 |
| 192,766 | A | * | 7/1877 | Jonasson | 112/147 |
| 557,757 | A | * | 4/1896 | Beale | 428/124 |
| 1,237,243 | A | | 8/1917 | Conner | |
| 1,989,794 | A | * | 2/1935 | Duvall | 428/102 |
| 2,241,812 | A | * | 5/1941 | Gowdy | 2/406 |
| 2,372,632 | A | * | 3/1945 | Webb | 428/104 |
| 3,477,552 | A | * | 11/1969 | Goldman | 190/2 |
| 3,489,194 | A | | 1/1970 | Hoover | |
| 4,195,378 | A | | 4/1980 | Parker | |
| 4,278,719 | A | * | 7/1981 | Sarnecki | 428/78 |
| 4,329,747 | A | | 5/1982 | Russell | |
| 4,375,111 | A | | 3/1983 | Hall | |
| 4,385,090 | A | * | 5/1983 | Sims | 428/121 |

(Continued)

FOREIGN PATENT DOCUMENTS

DE    31 41 668 A1    5/1983
FR    2507-454       12/1982

(Continued)

OTHER PUBLICATIONS

English translation of JP 07-216727.*

*Primary Examiner* — Michael C Miggins (74) *Attorney, Agent, or Firm* — John F. A. Earley, III; Frank J. Bonini, Jr.; Harding, Earley, Follmer & Frailey, P.C.

(57) ABSTRACT

A textile product in the form of a lightweight, portable and versatile mat that is both waterproof, padded and comfortable. The mat of the present invention comprises a waterproof backing material, a foam padded lining, and an acrylic top layer securely laminated or otherwise affixed one to the other.

35 Claims, 7 Drawing Sheets

(56) References Cited

U.S. PATENT DOCUMENTS

| | | | |
|---|---|---|---|
| 4,466,516 A * | 8/1984 | Sicoli et al. | 190/2 |
| 4,499,131 A * | 2/1985 | Knox | 428/68 |
| 4,516,668 A | 5/1985 | Grayek | |
| 4,634,618 A * | 1/1987 | Greer et al. | 428/81 |
| 4,671,393 A | 6/1987 | Rainey | |
| 4,703,528 A | 11/1987 | Rolle | |
| 4,723,300 A | 2/1988 | Aranow | |
| 4,738,545 A | 4/1988 | Westgor | |
| 4,844,965 A * | 7/1989 | Foxman | 428/91 |
| 4,917,505 A * | 4/1990 | Bullard et al. | 383/4 |
| 4,925,241 A | 5/1990 | Geraci | |
| 4,939,017 A * | 7/1990 | Foxman | 428/192 |
| 5,005,679 A | 4/1991 | Hjelle | |
| 5,010,610 A | 4/1991 | Ackley | |
| 5,081,727 A * | 1/1992 | Ippolito | 5/419 |
| 5,136,738 A * | 8/1992 | Denson | 5/417 |
| 5,291,625 A | 3/1994 | Leslie | |
| 5,386,603 A * | 2/1995 | Drust | 5/417 |
| 5,427,834 A * | 6/1995 | Sodetz | 428/83 |
| 5,443,880 A * | 8/1995 | Wike | 428/78 |
| 5,454,125 A * | 10/1995 | Ratkowski | 5/417 |
| 5,500,267 A * | 3/1996 | Canning | 428/68 |
| 5,509,515 A | 4/1996 | Guo | |
| 5,644,807 A | 7/1997 | Battistella | |
| 5,735,004 A * | 4/1998 | Wooten et al. | 5/502 |
| 5,740,566 A | 4/1998 | Stacy | |
| 5,763,333 A * | 6/1998 | Suzuki et al. | 442/351 |
| 5,843,556 A * | 12/1998 | Levas | 428/99 |
| 5,946,723 A * | 9/1999 | DiPrato et al. | 2/88 |
| 6,212,711 B1 | 4/2001 | Gilmour | |
| 6,213,267 B1 | 4/2001 | Miller | |
| 6,223,367 B1 * | 5/2001 | French et al. | 5/419 |
| 6,367,083 B1 * | 4/2002 | November | 2/69.5 |
| 6,386,761 B1 | 5/2002 | Bohnsack | |
| 6,393,638 B1 * | 5/2002 | MacColl | 5/419 |

FOREIGN PATENT DOCUMENTS

| | | | |
|---|---|---|---|
| FR | 2666493 A | | 9/1990 |
| GB | 1 264 919 | | 2/1972 |
| JP | 07-216727 | * | 8/1995 |

* cited by examiner

WATERPROOF LAMINATED MAT

CROSS-REFERENCE TO RELATED APPLICATION

This application claims priority from U.S. Provisional Patent Application Ser. No. 60/333,471, filed on Nov. 28, 2001.

BACKGROUND OF THE INVENTION

1. Field of the Invention

The present invention generally relates to mats and blankets, and, more particularly, to a laminated mat or blanket, comprised of textile and plastic materials, useful as a ground cover, a waterproof blanket, a seating pad, a seat or cargo area cover, a furniture cover, and the like.

2. Brief Description of the Related Art

U.S. Pat. No. 5,427,834, which is incorporated herein by reference, to Sodetz discloses a waterproof textile product, useful as a blanket. The blanket comprises a waterproof nylon layer and an acrylic lining layer attached to the waterproof layer. The outer surface of the nylon layer is coated with urethane. The waterproof layer and the lining layer are attached by a binding element stitched along the perimeters of the two layers.

Sodetz discloses that a blanket can be used to keep a person warm while resting or sleeping. In addition to its primary use, a blanket has several secondary uses. A blanket may be used to keep a person warm while attending an outdoor function, such as a baseball or football game, or it may be spread out in a park during a picnic or on the beach on a summer afternoon. According to Sodetz, a conventional blanket becomes ineffective for almost any use when it is exposed to an undue amount of moisture. Thus, for example, one cannot rely on a conventional blanket during a rain shower at the local football game; similarly, use of a conventional blanket for a picnic the day after a storm may result in an unpleasant experience as moisture from the wet ground seeps through the fabric.

The solution to which Sodetz arrived involves the construction detailed above. There remains, however, a need for a mat or blanket of simpler and less expensive construction which is more functional, durable and versatile than that disclosed by Sodetz.

SUMMARY OF THE INVENTION

In a preferred embodiment, our invention comprises a textile product in the form of a lightweight, portable and versatile mat or blanket that is both waterproof, padded and comfortable. The mat in a preferred embodiment of the present invention comprises a waterproof backing material, a foam padded lining, and an acrylic top layer securely laminated or otherwise affixed one to the other.

In one or more other preferred embodiments, the mat is foldable onto itself to facilitate storage and transport.

In one embodiment, the mat is foldable into itself with the use of a zipper disposed on the perimeter of the mat.

Indicia or a logo may be contained on a flap of the mat which is or remains visible when folded. The indicia or logo may also be printed directly on the mat itself.

The mat may be provided with a binding along the perimeter.

In another embodiment, the mat is provided with a pocket for holding items, such as, for example, a wallet or keys.

In another embodiment, the mat is provided with a pocket or opening for a pillow. A pillow may be provided for attachment to the mat. Through attachment elements, the pillow may be removably attached to the mat when needed.

A pouch may be provided to carry the mat and pillow together. The pouch may be made from the same material as the mat.

In another preferred embodiment, a duffel type bag type container is provided with one or more detachable pockets. The mat or mat and pillow, may be stored in the detachable pocket.

Alternately, in another preferred embodiment, the mat has attachment elements for removably fastening the mat to a container, such as a case or picnic basket, for storage on the container.

DETAILED DESCRIPTION OF THE PREFERRED EMBODIMENTS

Figure 1:
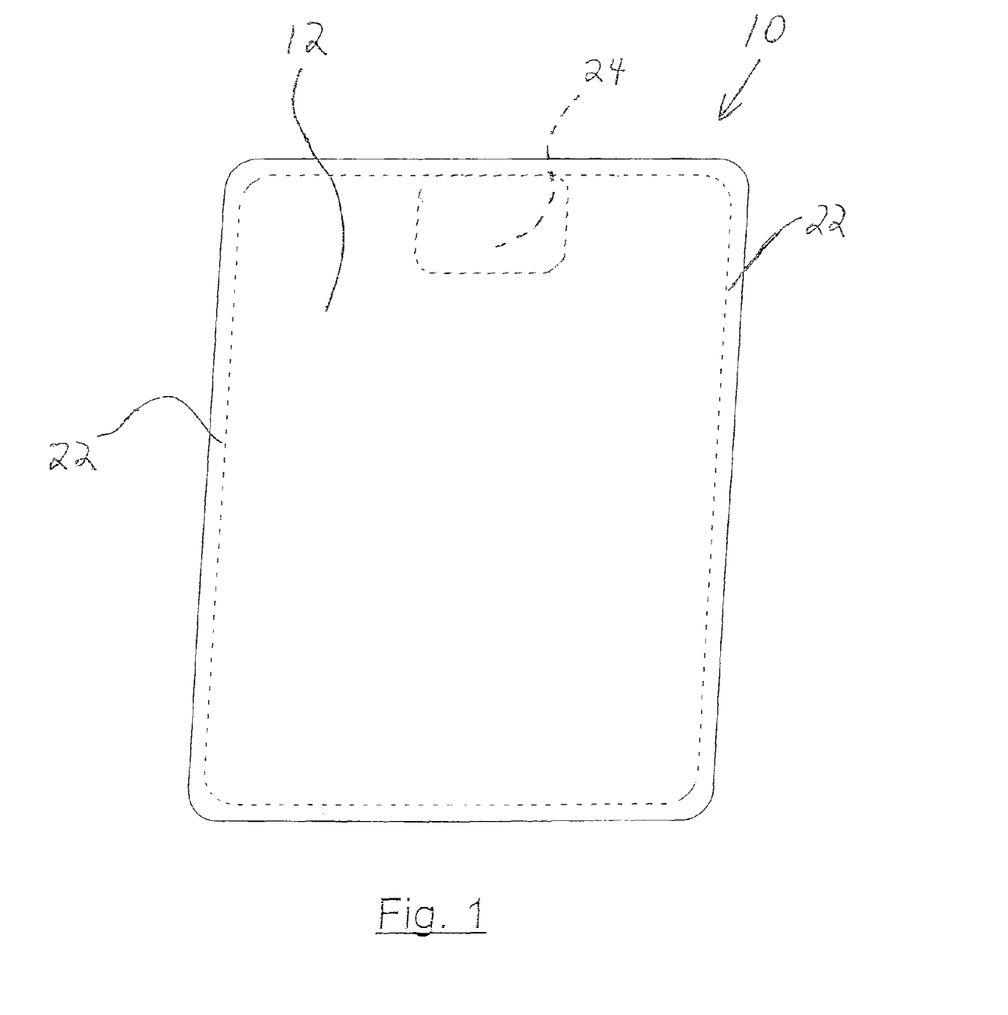
FIG. 1 shows a view in top plan of a mat 10 constructed in accordance with the present invention.
Figure 2:
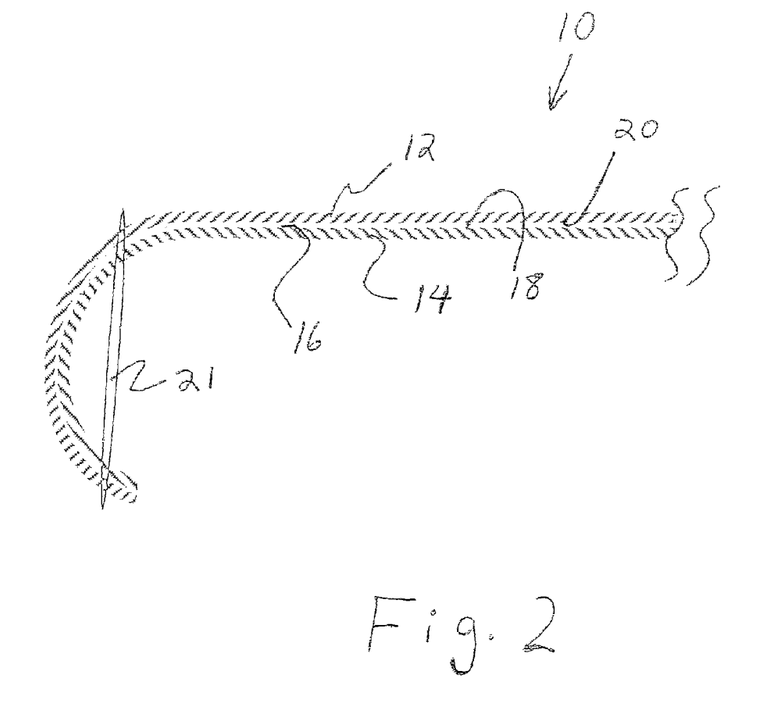
FIG. 2 shows a partial view in cross-section of the mat 10 of FIG. 1.

Turning to the drawings, there is shown in FIGS. 1 and 2 a preferred embodiment of our invention, which comprises a mat or blanket 10, which is substantially planar and preferably has a length greater than 4 feet and preferably has a width greater than 4 feet. The mat 10 may be configured in a variety of shapes, such as square, rectangular, oval, or circular, and a mat 10 having a rectangular configuration having a length of 48 inches or greater and a width of 60 inches or greater is preferred. However, smaller mats 10 are preferred as individual seating cushions.

The mat 10 has a textile layer 12 securely laminated or otherwise affixed to a waterproof or water-resistant layer 14.

Preferably, the textile layer 12 comprises a fabric made acrylic fibers, canvas, cotton, poly/cotton blends, nylon, polyethylene fleece, wool, or blends thereof.

The waterproof or water-resistant layer 14 preferably comprises polyvinyl chloride (PVC) or other waterproof or water-resistant material, which is preferably pigmented, and has a thickness of at least 0.05 mm. Preferably, the waterproof or water-resistant layer 14 has a thickness of 0.09 mm.

The textile layer 12 is laminated or affixed to the waterproof or water-resistant layer 14 by use of an adhesive or cement 16, such as a cement sold under the trademark Aquace-L-401, by applying the cement 16 to the top surface 18 of the waterproof layer 14 or the bottom surface 20 of the textile layer 12 and then pressing the textile layer 12 and the waterproof or water-resistant layer 14 together. The waterproof or water-resistant layer 14 may be formed on the textile layer 12. This may be done by spraying or a direct lamination process.

The textile layer 12 and waterproof or water-resistant layer 14 are preferably further secured together by placing the textile layer 12 and the waterproof or water-resistant layer 14 together so that their perimeters are generally aligned, folding over a small portion of both the textile layer 12 and waterproof or water-resistant layer 14 together along each perimeter, and stitching with a self-binding stitch 21 or otherwise securing a hem 22 along the folded perimeter.

Figure 2A:
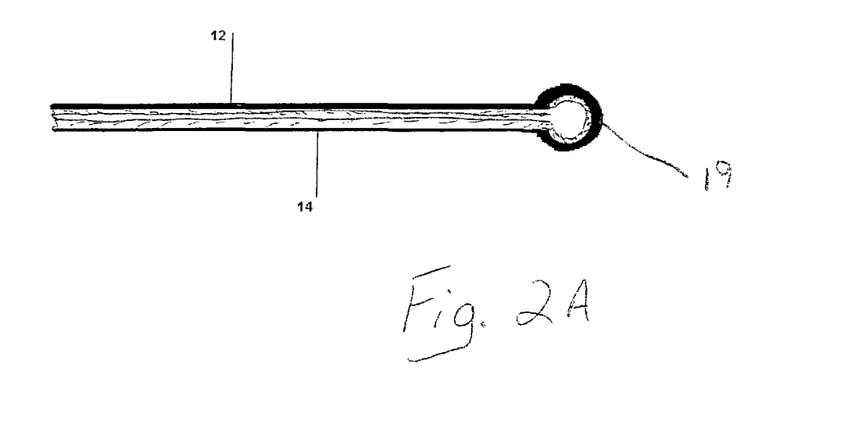
FIG. 2A is a partial sectional view of the mat 10, shown with a separate binding element 19.

The textile layer 12 and the waterproof or water resistant layer 14 may be secured together by placing the textile layer 12 and the waterproof or water resistant layer 14 so that their edges are generally aligned, and stitched together by a separate binding element along the folded perimeter. Referring to FIG. 2A, the textile layer 12 and water resistant layer 14 are illustrated with a binding 19 disposed about the perimeter. The binding 19 may be provided as a separate element and secured to both the textile layer 12 and water resistant layer 14.

Figure 3:
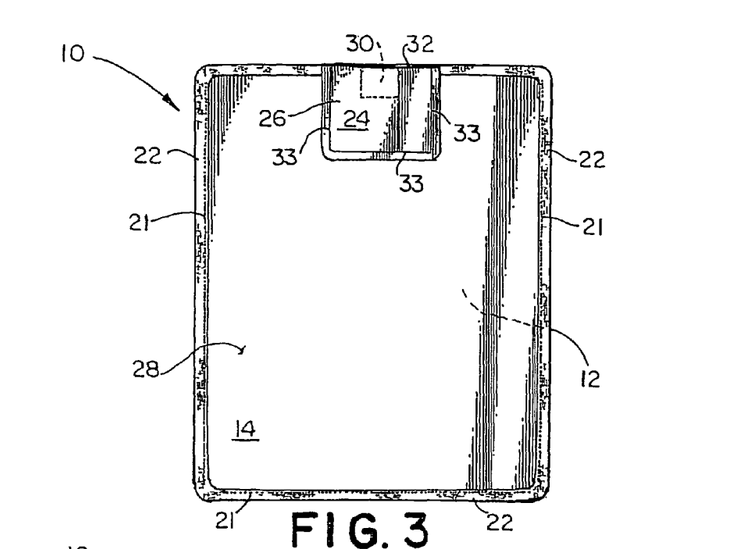
FIG. 3 is a view in bottom plan of the mat 10, illustrating an optional pocket 24.
Figure 4:
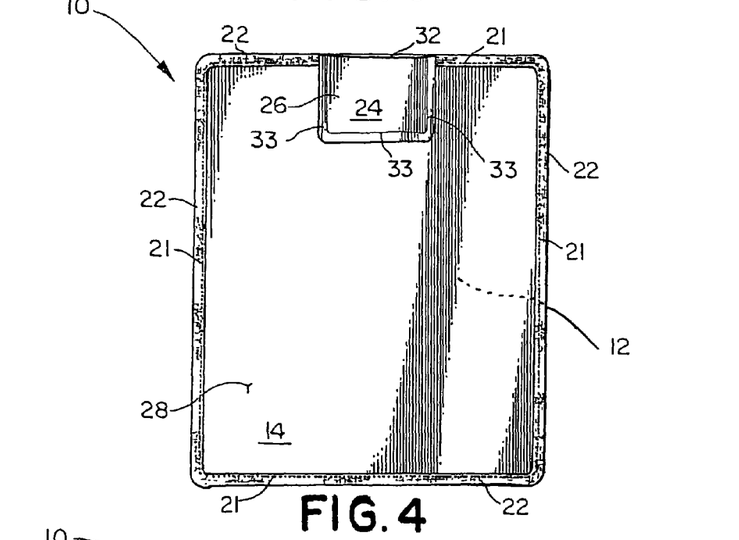
FIG. 4 is a view in bottom plan of the mat 10, illustrating another optional pocket 24.

Optionally, the mat 10 may be provided with a pocket 24. Referring to FIGS. 1 and 3, pocket 24 is preferably formed by adhering a sheet 26, preferably made of waterproof material such as PVC, to a portion of the bottom surface 28 of the waterproof or water-resistant layer 14, such that a space is formed between a portion of the sheet 26 and the bottom surface 28 of the waterproof or water-resistant layer 14 for holding items, such as a wallet, keys, and snacks. As illustrated in FIG. 3 the pocket 24 may be provided with a closure mechanism 30, such as hook and counterpart loop strips (e.g. Velcro strips) at the opening 32 of the pocket 24. The pocket 24 is preferably located on the bottom surface 28 of the waterproof or water-resistant layer 14 so that the pocket 24 is hidden from view while the mat 10 is deployed on the ground. Alternatively, as illustrated in FIG. 4, the pocket 24 may be defined by stitching 33 or other peripheral binding, with the layers of the mat 10 located in the area defined by such stitching 33 or binding being unadhered to one another such that a space for holding objects is formed between the unadhered portions of the layers of the mat 10. In this alternative embodiment, a closure mechanism 34, such as hook and counterpart loop strips, may be affixed to the appropriate layers of the mat 10 at the opening 32 of the pocket 24.

Figure 5:
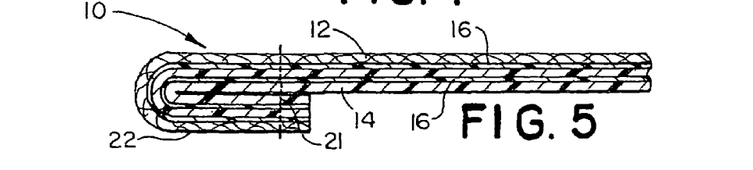
FIG. 5 is a partial view in cross-section showing the mat 10 provided with an optional lining layer 36.

As shown in FIG. 5, the mat 10 may optionally be provided with a lining layer 36. The optional lining layer 36 preferably comprises a sheet of polyurethane foam having a thickness of about 1 mm to 10 mm, and preferably 3 mm, and a density of about 24 kg/m³. The lining layer 36 is preferably laminated to both the textile layer 12 and the waterproof or water-resistant layer 14 using an adhesive or cement such as Aquace-L-401 cement. When the mat 10 includes a lining layer 36, the perimeter of the lining layer 36 is aligned with the perimeters of the textile layer 12 and the waterproof or water-resistant layer 14, and a small portion of all the layers together are folded over along the perimeters and stitched or otherwise secured together by a hem 22 along the folded perimeters. Alternatively, the hem 22 may be formed by folding one or more of the layers of the mat 10 over the other layers of the mat 10 and securing the layers together, such as by stitching. The mat 10 may also be provided with more than one lining layer 36, with the various lining layers 36 being comprised of the same material, different materials for each layer, or a combination of layers being made of the same material and layers being made of different materials. Like the three-layer embodiment of the invention set out above, each layer of a mat 10 that has four or more layers is laminated or otherwise affixed to the adjacent layer, and alternatively, the hem 22 may be formed by folding one or more of the layers of the mat 10 over the other layers of the mat 10 and securing the layers together, such as by stitching.

Figures 6, 7:
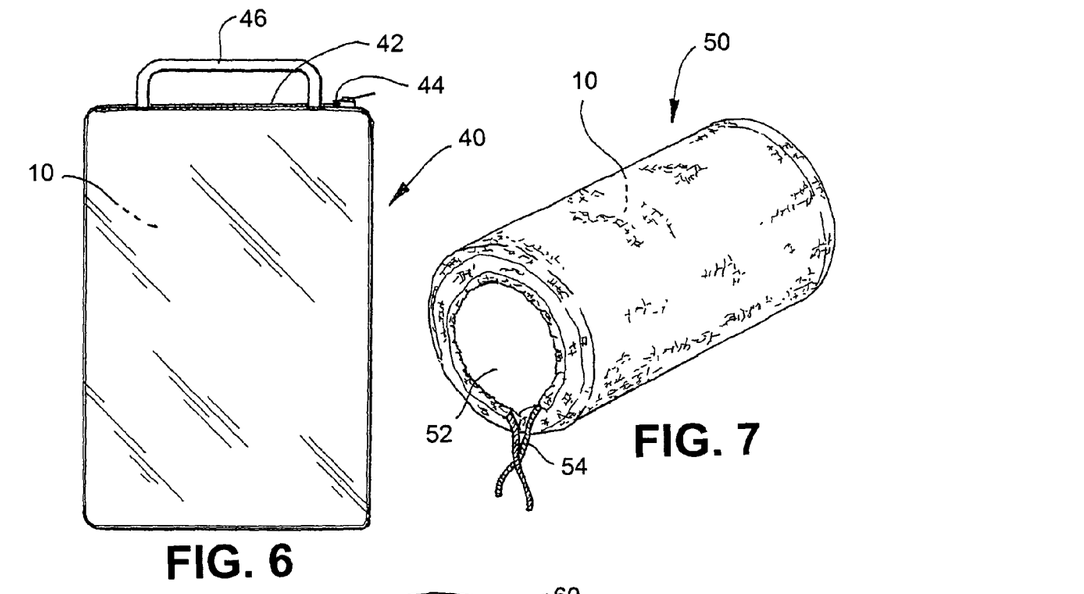
FIG. 6 is a view in front elevation of a carrying case 40, constructed in accordance with the invention.
FIG. 7 is a perspective view of a travel bag 50, constructed in accordance with the invention.

The mat 10 of the present invention may optionally be one component of a system. In addition to the mat 10, the system may include a carrying case 40, which is shown in FIG. 6. Carrying case 40 preferably comprises a hollow container for carrying or storing the mat 10. The carrying case 40 is provided with an opening 42 through which the mat 10 is placed into the interior of the carrying case 40 and from which the mat 10 may be withdrawn from the carrying case 40 when it is desired to use the mat 10. The carrying case 40 is provided with a closure mechanism 44, such as a zipper or snap closure apparatus, attached to the carrying case 40 at the opening 42. The carrying case 40 has a handle 46 mounted thereon to facilitate carrying of the carrying case 40. Preferably the carrying case 40 is made of a waterproof or water-resistant material to keep the mat 10 dry and clean when housing the mat 10. The carrying case 40 may be made of a transparent or semi-transparent plastic material to permit the color or design of the mat 10 to be shown through the carrying case 40.

The system may also include a matching or a contrasting travel bag 50, as shown in FIG. 7 which may be used to store or carry the mat 10 therein. The travel bag 50 preferably comprises a sack having an opening 52 at one end into which the mat may be inserted into the travel bag 50 and from which the mat 10 may be withdrawn from the travel bag 50 when it is desired to use mat 10. A drawstring closure mechanism 54 preferably is formed at the opening 52 of the travel bag 50 for closing the opening 52 shut after the mat 10 has been inserted into the travel bag 50.

Figure 8:
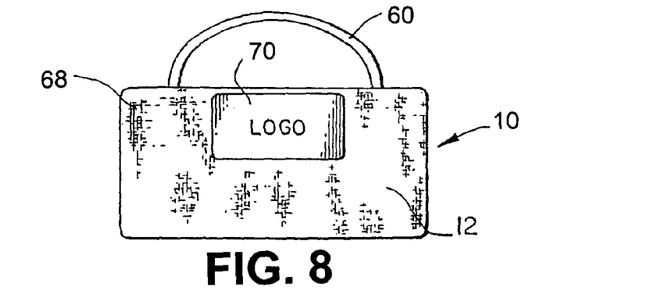
FIG. 8 is a view in front elevation of a rolled-up mat 10.
Figure 9:
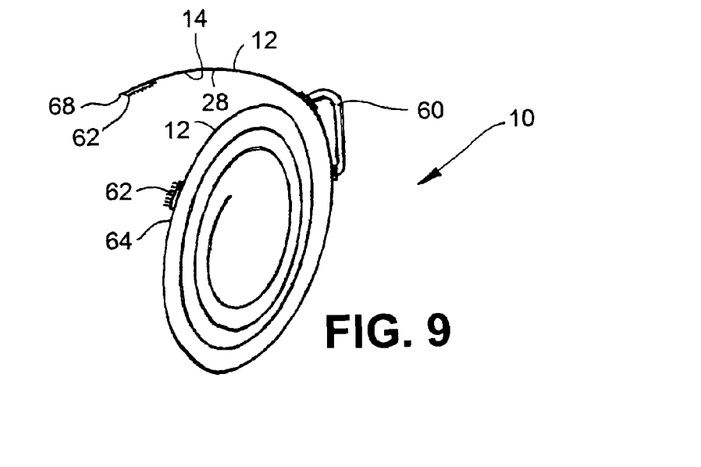
FIG. 9 is a view in cross-section of a rolled-up mat 10.

Referring to FIGS. 8 and 9, the mat 10 may also be provided with a lace or strap 60 which is attached to the mat 10 and forms a handle for carrying the mat 10.

Also, as shown in FIGS. 8 and 9, the mat 10 may be provided with fastening means for securing the mat 10 in a rolled-up position when the mat 10 is not in use. The fastening means may comprise, for example, a hook and loop fastening mechanism 62, such as Velcro® fastening strips, with a strip of hooks preferably affixed to the bottom surface 28 of the flap 68 or foldover portion, and a strip of loops affixed to the top surface 64 of the textile layer 12 at a position that matches the location of the strip of hooks when the mat 10 is rolled-up to secure the mat 10 in a rolled-up configuration. However, if desired, the strips of loops may be affixed to the bottom surface of the waterproof or water-resistant layer 14 and the strip of hooks affixed to the top surface 64 of the textile layer 12. The mat 10 may be easily carried in this rolled-up configuration by using the strap 60 or by merely grabbing the mat 10.

The fold over flap 68 shown in FIG. 8 may consist of the various layers of materials as described and in addition, may be made of a matching or contrast material such as acrylic, nylon, polyester, cotton or similar material, or can be constructed as a layered or single system. Either of the exposed sides of the flap could also be made of a material such as leather, polyurethane or similar imitation leather. Any of these materials making up the fold over flap may be connected to the balance of the mat by means of stitching, a snap, buckle, strap or hook and loop closure 62.

The strap 60 may be made of an nylon, polyester, or leather strap preferably with a width of ¾" but may be smaller or larger, that is directly attached to the mat 10 by means of direct stitching, a buckle, hook and loop, zipper or snap button. The mat 10 may also be placed as part of or a separate item to a travel bag or duffle bag by securing it by a variety of means such as but not limited to, zipper pouch, hook and loop fasteners, elastic cords, nylon cords with clips, or an adjacent pouch for containing the mat. This design incorporates the use of a backpack, or duffle bag to conveniently transport the mat.

For advertising or promotional purposes, a logo, design, or name can be added to the various sections of the mat, fold over flap, carry handle, carry bag, travel bag, duffle bag, pillow or self zippered case so that the logo design may be seen or shown when the mat is opened or displayed. As illustrated in FIG. 8, the logo design 70 may be placed on the flap 68. The logo, design, name may be applied in a variety of ways, but not limited to: silk screen printing, die stamp emboss or deboss, direct embroidery, puff printing, pad printing, transfer, patches, heat transfer, sewn on applications.

Figure 10:
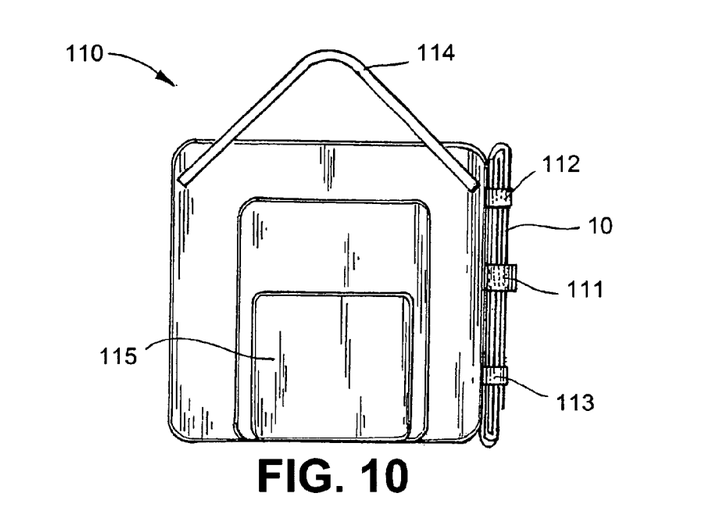
FIG. 10 is a side elevation view of a rolled-up mat 10 being secured to a container 110.

The mat 10 also may be attached to a case, pouch, bag, basket, backpack or such product that may contain additional items for use at places and events such as a picnic, sporting event, concert or camping by means of a zipper pouch, hook and loop, elastic cords, nylon cords with clips or such. The mat 10 is illustrated in FIG. 10 with attachment means for attaching the mat 10 to a container, such as, for example, a nylon case or picnic basket 110. The attachment means preferably may comprise a strap 111, as illustrated, having a surface of hooks and a mating surface of loops. Alternately, the securing strap 111 may have clips, buckles, or other fastening members for holding the mat 10. Fastening means also may be provided for securing the mat 10 against the basket 110. Fastening means is shown comprising clips 112, 113. The fastening means may be prepositioned on the mat 10, the basket 111 or both to facilitate the positioning of the mat 10 in substantially close proximity to the container or basket 111. The container 110 may have a handle 114, and may have one or more pockets 115.

Figure 11:
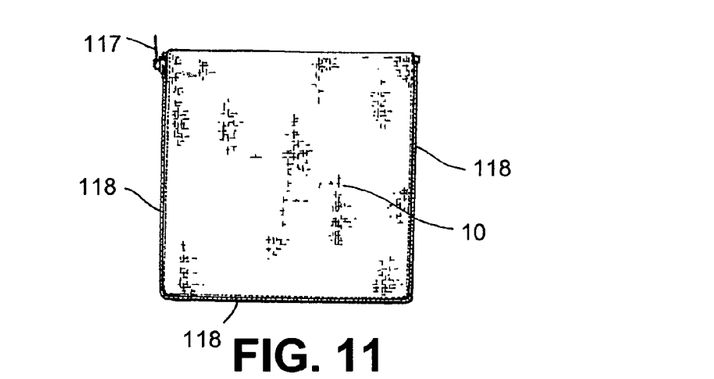
FIG. 11 is a top plan view of a mat 10 shown having a zipper around the perimeter.

The mat 10 may also be folded in such a manner so that it is self-contained with a sewn on zipper when folded such that the zipper forms a pouch that the mat may be transported in and kept folded and clean. The self-contained zipper bag may have a stitched-on handle made of nylon, polyester, leather or similar materials so that it can easily be carried. FIG. 11 illustrates an embodiment of the mat 10 having a zipper 117 disposed around its perimeter to permit the mat 10 to be folded onto itself when the zipper pull 118 is drawn around the perimeter.

Figure 12:
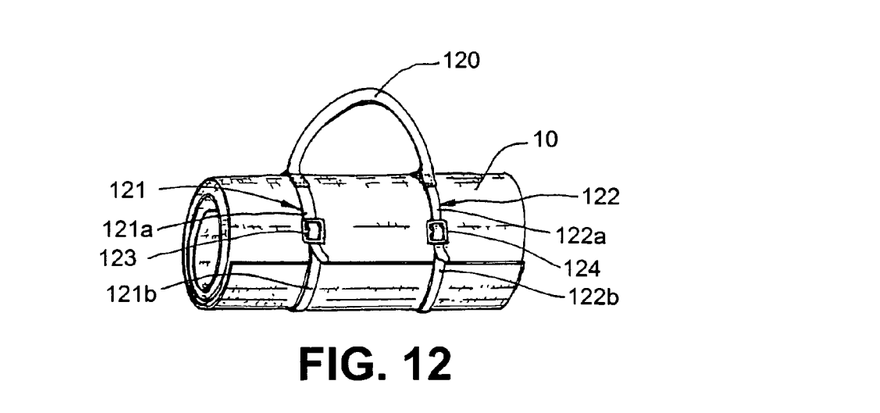
FIG. 12 is a front view of a rolled-up mat 10 shown with adjustable straps.

The mat 10 may be rolled or folded in such a way to reduce the size and a separate adjustable or fixed strap made of nylon, leather, polyester or similar material would fit around the rolled or folded mat 10 to become a carry handle. This strap may have a buckle or clip to adjust the tension and length of the carry handle straps. As illustrated in FIG. 12, the mat 10 is provided with a handle 120, and strap means for securing the rolled or folded mat 10 in a particular configuration to facilitate storage and transport of the mat 10. The strap means is shown comprising a first strap 121 and a second strap 122. Fastening elements 123, 124 are provided to secure the straps around the mat 10. Preferably, the first strap 121 has two components 121a, 121b which may be secured and released with the fastening element 123. Similarly, the strap components 122a, 122b of the second strap 122 may be secured and released with the fastening element 124. The straps 121, 122 with the fastening elements 123, 124 may be adjustably provided to permit the user to maintain a desired tightness of the folded or rolled mat 10.

Figure 13:
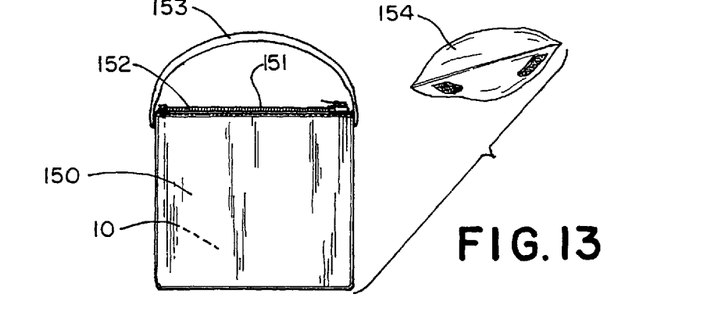
FIG. 13 is a front elevation view showing the mat 10 enclosed within a pouch, and showing separately a pillow.
Figure 14:
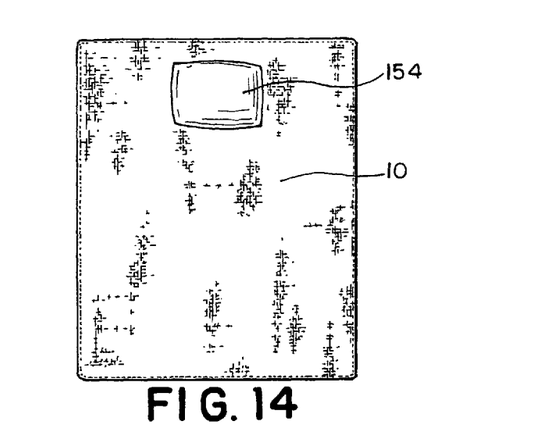
FIG. 14 is a top plan view of a mat 10 shown with a pillow attached to the surface 12 of the mat 10.

Referring to FIG. 13, the mat 10 may be folded in such a way to fit inside a carry pouch 150 which may be made of acrylic, nylon, canvas polyester or a similar material. The pouch 150 may be securable, and as illustrated may be provided with an opening 151 secured with a zipper 152. The pouch 150 preferably has a handle 153 to facilitate carrying. The pouch 150 may contain an inflatable pillow or bladder 154 that attaches to the mat 10 by a hook and loop closure, zipper, snap, clip or similar vehicle for attachment (see FIG. 14). The separate inflatable pillow or bladder 154, which stores deflated may be inflated and inserted back into the carry pouch 150 to form the pillow. In this manner, the inflatable pillow or bladder 154 may be stored in a deflated condition within the pouch 150, and then taken out, inflated to the desired condition, and then replaced within the pouch 150 so that the pouch 150 itself then becomes a pillow for the user. The mat 10 may be provided with a separate pocket or opening, which is secured by hook and loop, zipper or similar at one side of the mat 10 where the inflatable pillow or bladder 154 may be inserted to provide additional comfort for a user of the mat 10. The pocket or opening may, for example, be constructed like the pocket 26 shown and described herein. The pocket may be sized to accommodate the pillow dimensions. The mat 10 and pillow 154 may be provided with fastening elements for facilitating attachment of the pillow 154 to the mat 10. One example of a fastening element is surfaces of hooks and loops which are provided on the mat 10 and pillow 154 so the surfaces of hooks connect with the surfaces of loops when brought together.

In use, the mat 10 may be placed on a surface, such as a grass field or a beach, with waterproof or water-resistant layer 14 facing downwardly and the textile layer 12 facing upwardly to prevent any moisture from seeping through the mat 10 from the surface that the mat 10 covers while providing a comfortable surface to sit or recline on. The inventive mat 10 may also be used on picnic tables, benches, and like surfaces that may be wet, without any moisture seeping through the mat 10.

Also, the mat 10 may be used to keep its user warm and dry. For example, the mat 10 may be used at a sporting event to keep a spectator warm by wrapping the mat 10 around the spectator. Preferably the waterproof or water-resistant layer 14 faces outwardly when wrapped around a spectator and the textile layer 12 faces inwardly in contact with the spectator. With the waterproof or water-resistant layer 14 facing outwardly, the waterproof or water-resistant layer 14 acts as windbreaker and a block against any rain penetrating through the mat 10 to the spectator.

Figure 15:
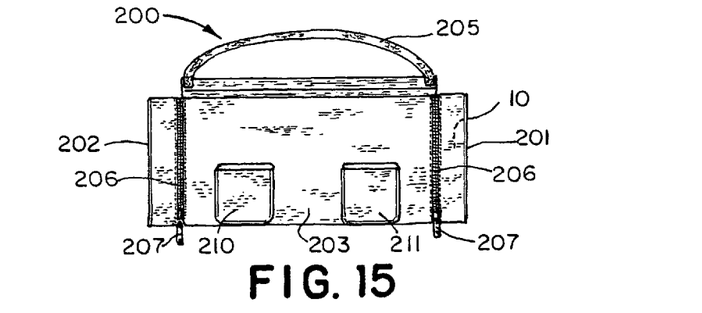
FIG. 15 is a side elevation view of the mat 10, illustrated in broken-lines, shown enclosed in a detachable pocket of a container.

The mat 10 is illustrated in FIG. 15 in a container 200 configured as a bag preferably with a first detachable pocket 201, and may have a second detachable pocket 202. The mat 10 is positioned in the first detachable pocket 201. The pocket 201 may be detached from the body 203 of the container 200, so that the mat 10 can be transported separately from the container 200. Preferably, a handle 205 is provided for facilitating carrying of the container 200. Similarly, the first pocket 201 and the second pocket 202 may have handles (not shown). The detachable pocket 201 may be releasably secured to the container body 203 with a suitable attachment means, such as, for example, a zipper 206 shown with a zipper tab 207. Similarly, the second pocket 202 may be secured with attachment means. In addition to the mat 10, the pillow 150 may also be stored in the first pocket 201. The container 200 may for example, have one or more additional pockets, such as the pockets 210, 211 which are not detachable.

The invention claimed is:

1. A laminated substantially waterproof mat, comprising
a waterproof or water-resistant layer,
a textile layer comprising a fabric, and a foam layer disposed between said waterproof or water-resistant layer and said textile layer;
said waterproof or water-resistant layer having an interior surface and an exterior surface,
said textile layer having an interior surface and an exterior surface,
said foam layer having a first surface adhesively laminated to said waterproof or water resistant layer and a second surface adhesively laminated to said textile layer
the layers being secured together by adhesive lamination,
wherein said adhesively laminated foam layer resists movement relative to said waterproof or water-resistant layer and said textile layer,
further comprising an arrangement of a handle secured to the mat; wherein said arrangement of a handle comprises a handle strap and a flap associated with said handle strap, said flap being comprised of said secured together layers and being foldable to a rolled or folded condition, the handle arrangement further including a fastening mechanism, said flap being securable with said fastening mechanism to secure the mat in said rolled or folded condition, said handle strap being functional to carry the mat when the mat is secured in said rolled or folded condition, said flap and said fastening mechanism securing said mat in said rolled or folded condition in which said mat may be transported using said handle strap;
wherein said mat has a first end and a second end;
wherein said flap has a first end that is a free end defining said first end of said mat and wherein said flap has a second end that is a foldable end;
wherein said handle strap of said handle arrangement is disposed at said flap second end;
wherein said mat has a length defined by a distance between said first mat end and said second mat end;
wherein said flap forms said first mat end;
wherein said flap second surface is positioned to overlap said mat exterior when said mat is in a rolled or folded condition, and
wherein said fastening mechanism comprises a first surface of hooks or loops provided on said flap second surface, and a mating surface of hooks or loops provided on a location on one of said waterproof or water resistant layer exterior surface or said textile layer exterior surface disposed at distance from said first mat end, so that when the mat is rolled or folded to a rolled or folded condition, said mating surface of hooks or loops aligns in an engaging relationship with said first surface of hooks or loops provided on said flap second surface;
wherein said first surface of hooks or loops provided on said flap second surface are located closer to said flap first end than they are to said handle strap;
wherein said second mat end is free of a surface of hooks or loops;
wherein said second mat end is rolled or folded over a plurality of times until the flap of said first mat end engages said mating surface of hooks or loops; and
wherein said waterproof or water-resistant layer forms said flap second surface, and wherein said fabric layer forms said flap first surface.

2. The mat of claim 1 wherein a closure mechanism is provided to secure the flap to the mat.

3. The mat of claim 1 wherein the flap has at least a first surface, and wherein the flap is configured to have its first surface viewable when the mat is rolled or folded, and wherein the first surface contains indicia thereon.

4. The mat of claim 3, wherein the indicia comprises a logo.

5. The mat of claim 3, wherein the indicia comprises advertising.

6. A laminated substantially waterproof mat, comprising
a waterproof or water-resistant layer having an interior surface and an exterior surface,
a textile layer comprising a fabric, said textile layer having an interior surface and an exterior surface, and
a foam layer disposed between said waterproof or water-resistant layer and said textile layer;
said foam layer having a first surface adhesively laminated to said waterproof or water resistant layer and a second surface adhesively laminated to said textile layer
the layers being secured together by adhesive lamination,
wherein said adhesively laminated foam layer resists movement relative to said waterproof or water-resistant layer and said textile layer,
the layers being further secured by a hem substantially enclosing the periphery of the mat, the hem formed by folding one or more of the layers over the other layers and securing the layers together,
wherein the hem is further provided with a waterproof sealant;
further comprising an arrangement of a handle secured to the mat; wherein said arrangement of a handle comprises a handle strap and a flap associated with said handle strap, said flap being comprised of said secured together layers and being foldable to a rolled or folded condition, the handle arrangement further including a fastening mechanism, said flap being securable with said fastening mechanism to secure the mat in said rolled or folded condition, said handle strap being functional to carry the mat when the mat is secured in said rolled or folded condition, said flap and said fastening mechanism securing said mat in said rolled or folded condition in which said mat may be transported using said handle strap;
wherein said mat has a first end and a second end;
wherein said flap has a first end that is a free end defining said first end of said mat and wherein said flap has a second end that is a foldable end;
wherein said handle strap of said handle arrangement is disposed at said flap second end;
wherein the flap has at least a first surface, and wherein the flap is configured to have its first surface viewable when the mat is rolled or folded;
wherein said flap has at least a second surface, and wherein the flap is configured so that the second surface remains hidden from view when the mat is rolled or folded to said rolled or folded condition;
wherein said fastening mechanism is provided to secure the flap to the mat, said fastening mechanism comprising a first surface of hooks or loops provided on said flap second surface, and a mating surface of hooks or loops provided on a location on one of said waterproof or water resistant layer exterior surface or said textile layer exterior surface so that when the mat is rolled, said first surface of hooks and said mating surface of hooks are aligned in an engaging relationship;

wherein said first surface of hooks or loops provided on said flap second surface are located closer to said flap first end than they are to said handle strap;

wherein said second mat end is free of a surface of hooks or loops; and wherein said one of said waterproof or water resistant layer exterior surface or said textile layer exterior surface on which said mating surface of hooks or loops is provided is continuous with a surface portion that forms the exterior surface portion of said rolled or folded mat and where said exterior surface portion is free of said handle strap at exterior locations other than the flap;

wherein said fastening mechanism first surface of hooks or loops is provided on said flap second surface so that said fastening mechanism first surface of hooks or loops remains beneath and is covered by said second surface when said mat is rolled or folded to a rolled or folded condition;

wherein said flap first surface forms an exterior surface of mat along with one of said waterproof of or water-resistant layer exterior surface or said textile layer exterior surface; and wherein said mating surface of hooks or loops is provided on a location on one of said waterproof or water resistant layer exterior surface or said textile layer exterior surface, and wherein the handle is secured to extend from the other of said waterproof or water resistant layer exterior surface or said textile layer exterior surface, said handle extending from said exterior mat surface;

wherein said mat has a first end and a second end, and wherein said flap is provided at one end thereof.

7. The laminated substantially waterproof mat of claim 6, wherein said waterproof or water-resistant layer forms said flap second surface, and wherein said fabric layer forms said flap first surface.

8. The laminated substantially waterproof mat of claim 6, wherein the first surface contains indicia thereon.

9. A laminated substantially waterproof mat comprising
at least three layers, including
a first layer having an interior surface and an exterior surface comprising a membrane of polyvinyl chloride or other waterproof or water-resistant material having a thickness of at least about 0.05 mm and having an inner surface and an outer surface;
a second layer comprising a polyurethane foam layer having a thickness of at least 1 mm, and
a third layer comprising a fabric, said fabric layer having an interior surface and an exterior surface,
the layers being secured together by adhesive lamination and by a hem substantially enclosing the periphery of the mat, the hem being formed by folding one or more of the layers over the other layers and securing the layers together,
wherein the hem is formed by folding the waterproof or water-resistant layer over to cover the peripheral edges of the textile layer, and stitching through all layers with thread;
further comprising an arrangement of a handle secured to the mat; wherein said arrangement of a handle comprises a handle strap and a flap associated with said handle strap, said flap being comprised of said secured together layers and being foldable to a rolled or folded condition, the handle arrangement further including a fastening mechanism, said flap being securable with said fastening mechanism to secure the mat in said rolled or folded condition, said handle strap being functional to carry the mat when the mat is secured in said rolled or folded condition, said flap and said fastening mechanism securing said mat in said rolled or folded condition in which said mat may be transported using said handle strap;

wherein the flap has at least a first surface, and wherein the flap is configured to have its first surface viewable when the mat is rolled or folded;

wherein said mat has a first end and a second end;

wherein said flap has a first end that is a free end defining said first end of said mat and wherein said flap has a second end that is a foldable end;

wherein said handle strap of said handle arrangement is disposed at said flap second end;

wherein said flap has at least a second surface, and wherein the flap is configured so that the second surface remains hidden from view when the mat is rolled or folded to said rolled or folded condition;

wherein said flap first surface forms an exterior surface of mat along with one of said waterproof of or water-resistant layer exterior surface or said textile layer exterior surface;

wherein said mat has a first end and a second end, and wherein said flap is provided at one end thereof;

wherein said fastening mechanism is provided to secure the flap to the mat, said fastening mechanism comprising a first surface of hooks or loops provided on said flap second surface, and a mating surface of hooks or loops provided on a location on one of said waterproof or water resistant layer exterior surface or said textile layer exterior surface so that when the mat is rolled, said first surface of hooks and said mating surface of hooks are aligned in an engaging relationship;

wherein said first surface of hooks or loops provided on said flap second surface are located closer to said flap first end than they are to said handle strap;

wherein said second mat end is free of a surface of hooks or loops;

wherein said fastening mechanism first surface of hooks or loops is provided on said flap second surface so that said fastening mechanism first surface of hooks or loops remains beneath and is covered by said second surface;

wherein said mating surface of hooks or loops is provided on a location on one of said waterproof or water resistant layer exterior surface or said textile layer exterior surface, and wherein the handle strap is secured to extend from the other of said waterproof or water resistant layer exterior surface or said textile layer exterior surface, said handle strap extending from said exterior mat surface; and wherein said one of said waterproof or water resistant layer exterior surface or said textile layer exterior surface on which said mating surface of hooks or loops is provided is continuous with a surface portion that forms the exterior surface portion of said rolled or folded mat and where said exterior surface portion is free of said handle strap at exterior locations other than the flap.

10. The laminated substantially waterproof mat of claim 9, wherein said waterproof or water-resistant layer forms said flap second surface, and wherein said fabric layer forms said flap first surface.

11. The laminated substantially waterproof mat of claim 9, wherein the first surface contains indicia thereon.

12. The laminated substantially waterproof mat of claim 9, wherein said mat has a length defined by a distance between said first mat end and said second mat end;
wherein said flap forms said first mat end;
wherein said flap second surface is positioned to overlap said mat exterior when said mat is in a rolled or folded condition, and
wherein said mating surface of hooks or loops provided on a location on one of said waterproof or water resistant layer exterior surface or said textile layer exterior surface is disposed at distance from said first mat end, so that when the mat is rolled or folded to a rolled or folded condition, said mating surface of hooks or loops aligns in an engaging relationship with said first surface of hooks or loops provided on said flap second surface.

13. The laminated substantially waterproof mat of claim 12, wherein said second mat end is folded over a plurality of times until the flap of said first mat end engages said mating surface of hooks or loops.

14. A laminated substantially waterproof mat comprising at least three layers, including
a first layer having an interior surface and an exterior surface and comprising a membrane of polyvinyl chloride or other waterproof or water-resistant material having a thickness of at least about 0.05 mm and having an inner surface and an outer surface;
a second layer comprising a polyurethane foam layer having a thickness of at least 1 mm, and
a third layer comprising a fabric, said fabric layer having an interior surface and an exterior surface,
the layers being secured together by adhesive lamination and by a hem substantially enclosing the periphery of the mat, the hem being formed by folding one or more of the layers over the other layers and securing the layers together,
wherein the hem is formed by welding together layers of the mat at the peripheral edges of the layers;
further comprising an arrangement of a handle secured to the mat; wherein said arrangement of a handle comprises a handle strap and a flap associated with said handle strap, said flap being comprised of said secured together layers and being foldable to a rolled or folded condition, the handle arrangement further including a fastening mechanism, said flap being securable with said fastening mechanism to secure the mat in said rolled or folded condition, said handle strap being functional to carry the mat when the mat is secured in said rolled or folded condition, said flap and said fastening mechanism securing said mat in said rolled or folded condition in which said mat may be transported using said handle strap;
wherein said mat has a first end and a second end;
wherein said flap has a first end that is a free end defining said first end of said mat and wherein said flap has a second end that is a foldable end;
wherein said handle strap of said handle arrangement is disposed at said flap second end;
wherein the flap has at least a first surface, and wherein the flap is configured to have its first surface viewable when the mat is rolled or folded to said mat rolled or folded condition, and wherein the first surface contains indicia thereon;
wherein said flap has at least a second surface, and wherein the flap is configured so that the second surface remains hidden from view when the mat is rolled or folded to said mat rolled or folded condition;
wherein said fastening mechanism is provided to secure the flap to the mat, said fastening mechanism comprising a first surface of hooks or loops provided on said flap second surface, and a mating surface of hooks or loops provided on a location on one of said first layer or said third layer so that when the mat is rolled or folded, said first surface of hooks and said mating surface of hooks are aligned in an engaging relationship;
wherein said first surface of hooks or loops provided on said flap second surface are located closer to said flap first end than they are to said handle strap;
wherein said second mat end is free of a surface of hooks or loops;
wherein said fastening mechanism first surface of hooks or loops is provided on said flap second surface so that said fastening mechanism first surface of hooks or loops remains beneath and is covered by said second surface when said mat is rolled or folded to a rolled or folded condition;
wherein said flap first surface forms an exterior surface of mat along with one of said waterproof of or water-resistant layer exterior surface or said textile layer exterior surface;
wherein said mating surface of hooks or loops is provided on a location on one of said waterproof or water resistant layer exterior surface or said textile layer exterior surface, and wherein the handle is secured to extend from the other of said waterproof or water resistant layer exterior surface or said textile layer exterior surface, said handle extending from said exterior mat surface;
wherein said one of said waterproof or water resistant layer exterior surface or said textile layer exterior surface on which said mating surface of hooks or loops is provided is continuous with a surface portion that forms the exterior surface portion of said rolled or folded mat and where said exterior surface portion is free of said handle strap at exterior locations other than the flap; and
wherein said mat has a first end and a second end, and wherein said flap is provided at one end thereof.

15. The laminated substantially waterproof mat of claim 14, wherein said waterproof or water-resistant layer forms said flap second surface, and wherein said fabric layer forms said flap first surface.

16. The laminated substantially waterproof mat of claim 14, wherein the first surface contains indicia thereon.

17. The laminated substantially waterproof mat of claim 14,
wherein said mat has a length defined by a distance between said first mat end and said second mat end;
wherein said flap forms said first mat end;
wherein said flap second surface is positioned to overlap said mat exterior when said mat is in a rolled or folded condition, and
wherein said mating surface of hooks or loops provided on a location on one of said waterproof or water resistant layer exterior surface or said textile layer exterior surface is disposed at distance from said first mat end, so that when the mat is rolled or folded to a rolled or folded condition, said mating surface of hooks or loops aligns in an engaging relationship with said first surface of hooks or loops provided on said flap second surface.

18. The laminated substantially waterproof mat of claim 17, wherein said second mat end is folded over a plurality of times until the flap of said first mat end engages said mating surface of hooks or loops.

19. A laminated substantially waterproof mat comprising at least three layers, including
- a first layer having an interior surface and an exterior surface and comprising a membrane of polyvinyl chloride or other waterproof or water-resistant material having a thickness of at least about 0.05 mm and having an inner surface and an outer surface;
- a second layer comprising a polyurethane foam layer having a thickness of at least 1 mm, and
- a third layer comprising a fabric, said fabric layer having an interior surface and an exterior surface,
- the layers being secured together by adhesive lamination and by a hem substantially enclosing the periphery of the mat, the hem being formed by folding one or more of the layers over the other layers and securing the layers together,
- wherein the hem is further provided with a waterproof sealant;
- further comprising an arrangement of a handle secured to the mat; wherein said arrangement of a handle comprises a handle strap and a flap associated with said handle strap, said flap being comprised of said secured together layers and being foldable to a rolled or folded condition, the handle arrangement further including a fastening mechanism, said flap being securable with said fastening mechanism to secure the mat in said rolled or folded condition, said handle strap being functional to carry the mat when the mat is secured in said rolled or folded condition, said flap and said fastening mechanism securing said mat in said rolled or folded condition in which said mat may be transported using said handle strap;
- wherein said mat has a first end and a second end;
- wherein said flap has a first end that is a free end defining said first end of said mat and wherein said flap has a second end that is a foldable end;
- wherein said handle strap of said handle arrangement is disposed at said flap second end;
- wherein the flap has at least a first surface, and wherein the flap is configured to have its first surface viewable when the mat is rolled or folded to said mat rolled or folded condition, and wherein the first surface contains indicia thereon;
- wherein said flap has at least a second surface, and wherein the flap is configured so that the second surface remains hidden from view when the mat is rolled or folded to said mat rolled or folded condition;
- wherein said fastening mechanism is provided to secure the flap to the mat, said fastening mechanism comprising a first surface of hooks or loops provided on said flap second surface, and a mating surface of hooks or loops provided on a location on one of said first layer or said third layer so that when the mat is rolled or folded, said first surface of hooks and said mating surface of hooks are aligned in an engaging relationship;
- wherein said first surface of hooks or loops provided on said flap second surface are located closer to said flap first end than they are to said handle strap;
- wherein said second mat end is free of a surface of hooks or loops;
- wherein said fastening mechanism first surface of hooks or loops is provided on said flap second surface so that said fastening mechanism first surface of hooks or loops remains beneath and is covered by said second surface when said mat is rolled or folded to a rolled or folded condition;
- wherein said flap first surface forms an exterior surface of mat along with one of said waterproof of or water-resistant layer exterior surface or said textile layer exterior surface;
- wherein said mating surface of hooks or loops is provided on a location on one of said waterproof or water resistant layer exterior surface or said textile layer exterior surface, and wherein the handle is secured to extend from the other of said waterproof or water resistant layer exterior surface or said textile layer exterior surface, said handle extending from said exterior mat surface;
- wherein said one of said waterproof or water resistant layer exterior surface or said textile layer exterior surface on which said mating surface of hooks or loops is provided is continuous with a surface portion that forms the exterior surface portion of said rolled or folded mat and where said exterior surface portion is free of said handle strap at exterior locations other than the flap; and
- wherein said mat has a first end and a second end, and wherein said flap is provided at one end thereof.

20. The laminated substantially waterproof mat of claim 19, wherein said waterproof or water-resistant layer forms said flap second surface, and wherein said fabric layer forms said flap first surface.

21. The laminated substantially waterproof mat of claim 19, wherein the first surface contains indicia thereon.

22. The laminated substantially waterproof mat of claim 19;
- wherein said mat has a length defined by a distance between said first mat end and said second mat end;
- wherein said flap forms said first mat end;
- wherein said flap second surface is positioned to overlap said mat exterior when said mat is in a rolled or folded condition, and
- wherein said mating surface of hooks or loops provided on a location on one of said waterproof or water resistant layer exterior surface or said textile layer exterior surface is disposed at distance from said first mat end, so that when the mat is rolled or folded to a rolled or folded condition, said mating surface of hooks or loops aligns in an engaging relationship with said first surface of hooks or loops provided on said flap second surface.

23. The laminated substantially waterproof mat of claim 22, wherein said second mat end is folded over a plurality of times until the flap of said first mat end engages said mating surface of hooks or loops.

24. A laminated substantially waterproof mat comprising at least three layers, including
- a first layer having an interior surface and an exterior surface and comprising a membrane of polyvinyl chloride or other waterproof or water-resistant material having a thickness of at least about 0.05 mm and having an inner surface and an outer surface;
- a second layer comprising a polyurethane foam layer having a thickness of at least 1 mm, and
- a third layer comprising a fabric, said fabric layer having an interior surface and an exterior surface,
- the layers being secured together by adhesive lamination and by a hem substantially enclosing the periphery of the mat, the hem being formed by folding one or more of the layers over the other layers and securing the layers together, wherein the mat has a flap, the flap being configured to cover a portion of the mat when the mat is folded or rolled;

further comprising an arrangement of a handle secured to the mat; wherein said arrangement of a handle comprises a handle strap and a flap associated with said handle strap, said flap being comprised of said secured together layers and being foldable to a rolled or folded condition, the handle arrangement further including a fastening mechanism, said flap being securable with said fastening mechanism to secure the mat in said rolled or folded condition, said handle strap being functional to carry the mat when the mat is secured in said rolled or folded condition, said flap and said fastening mechanism securing said mat in said rolled or folded condition in which said mat may be transported using said handle strap;

wherein said mat has a first end and a second end;

wherein said flap has a first end that is a free end defining said first end of said mat and wherein said flap has a second end that is a foldable end;

wherein said handle strap of said handle arrangement is disposed at said flap second end;

wherein the flap has at least a first surface, and wherein the flap is configured to have its first surface viewable when the mat is rolled or folded to said mat rolled or folded condition, and wherein the first surface contains indicia thereon;

wherein said flap has at least a second surface, and wherein the flap is configured so that the second surface remains hidden from view when the mat is rolled or folded to said mat rolled or folded condition;

wherein said fastening mechanism is provided to secure the flap to the mat, said fastening mechanism comprising a first surface of hooks or loops provided on said flap second surface, and a mating surface of hooks or loops provided on a location on one of said first layer or said third layer so that when the mat is rolled or folded, said first surface of hooks and said mating surface of hooks are aligned in an engaging relationship;

wherein said first surface of hooks or loops provided on said flap second surface are located closer to said flap first end than they are to said handle strap;

wherein said second mat end is free of a surface of hooks or loops;

wherein said fastening mechanism first surface of hooks or loops is provided on said flap second surface so that said fastening mechanism first surface of hooks or loops remains beneath and is covered by said second surface when said mat is rolled or folded to a rolled or folded condition;

wherein said flap first surface forms an exterior surface of mat along with one of said waterproof of or water-resistant layer exterior surface or said textile layer exterior surface;

wherein said mating surface of hooks or loops is provided on a location on one of said waterproof or water resistant layer exterior surface or said textile layer exterior surface, and wherein the handle is secured to extend from the other of said waterproof or water resistant layer exterior surface or said textile layer exterior surface, said handle extending from said exterior mat surface;

wherein said one of said waterproof or water resistant layer exterior surface or said textile layer exterior surface on which said mating surface of hooks or loops is provided is continuous with a surface portion that forms the exterior surface portion of said rolled or folded mat and where said exterior surface portion is free of said handle strap at exterior locations other than the flap; and wherein said mat has a first end and a second end, and wherein said flap is provided at one end thereof.

25. The laminated substantially waterproof mat of claim 24, wherein said waterproof or water-resistant layer forms said flap second surface, and wherein said fabric layer forms said flap first surface.

26. The laminated substantially waterproof mat of claim 24, wherein the first surface contains indicia thereon.

27. The laminated substantially waterproof mat of claim 24, wherein said mat has a length defined by a distance between said first mat end and said second mat end;

wherein said flap forms said first mat end;

wherein said flap second surface is positioned to overlap said mat exterior when said mat is in a rolled or folded condition, and wherein said mating surface of hooks or loops provided on a location on one of said waterproof or water resistant layer exterior surface or said textile layer exterior surface is disposed at distance from said first mat end, so that when the mat is rolled or folded to a rolled or folded condition, said mating surface of hooks or loops aligns in an engaging relationship with said first surface of hooks or loops provided on said flap second surface.

28. The laminated substantially waterproof mat of claim 27, wherein said second mat end is folded over a plurality of times until the flap of said first mat end engages said mating surface of hooks or loops.

29. A laminated substantially waterproof mat comprising at least three layers, including a first layer having an interior surface and an exterior surface and comprising a membrane of polyvinyl chloride or other waterproof or water-resistant material having a thickness of at least about 0.05 mm and having an inner surface and an outer surface;

a second layer comprising a polyurethane foam layer having a thickness of at least 1 mm, and a third layer comprising a fabric, said fabric layer having an interior surface and an exterior surface, the layers being secured together by adhesive lamination and by a hem substantially enclosing the periphery of the mat, the hem being formed by folding one or more of the layers over the other layers and securing the layers together, having indicia appearing on the surface of at least one layer of the mat;

further comprising an arrangement of a handle secured to the mat; wherein said arrangement of a handle comprises a handle strap and a flap associated with said handle strap, said flap being comprised of said secured together layers and being foldable to a rolled or folded condition, the handle arrangement further including a fastening mechanism, said flap being securable with said fastening mechanism to secure the mat in said rolled or folded condition, said handle strap being functional to carry the mat when the mat is secured in said rolled or folded condition, said flap and said fastening mechanism securing said mat in said rolled or folded condition in which said mat may be transported using said handle strap;

wherein said mat has a first end and a second end;

wherein said flap has a first end that is a free end defining said first end of said mat and wherein said flap has a second end that is a foldable end;

wherein said handle strap of said handle arrangement is disposed at said flap second end;

wherein the flap has at least a first surface, and wherein the flap is configured to have its first surface viewable when the mat is rolled or folded to said mat rolled or folded condition, and wherein the first surface contains indicia thereon;

wherein said flap has at least a second surface, and wherein the flap is configured so that the second surface remains hidden from view when the mat is rolled or folded to said mat rolled or folded condition;

wherein said fastening mechanism is provided to secure the flap to the mat, said fastening mechanism comprising a first surface of hooks or loops provided on said flap second surface, and a mating surface of hooks or loops provided on a location on one of said first layer or said third layer so that when the mat is rolled or folded, said first surface of hooks and said mating surface of hooks are aligned in an engaging relationship;

wherein said first surface of hooks or loops provided on said flap second surface are located closer to said flap first end than they are to said handle strap;

wherein said second mat end is free of a surface of hooks or loops;

wherein said fastening mechanism first surface of hooks or loops is provided on said flap second surface so that said fastening mechanism first surface of hooks or loops remains beneath and is covered by said second surface when said mat is rolled or folded to a rolled or folded condition;

wherein said flap first surface forms an exterior surface of mat along with one of said waterproof of or water-resistant layer exterior surface or said textile layer exterior surface;

wherein said mating surface of hooks or loops is provided on a location on one of said waterproof or water resistant layer exterior surface or said textile layer exterior surface, and wherein the handle is secured to extend from the other of said waterproof or water resistant layer exterior surface or said textile layer exterior surface, said handle extending from said exterior mat surface; and wherein said mat has a first end and a second end, and wherein said flap is provided at one end thereof.

30. The laminated substantially waterproof mat of claim 29, wherein said waterproof or water-resistant layer forms said flap second surface, and wherein said fabric layer forms said flap first surface.

31. The laminated substantially waterproof mat of claim 29, wherein the first surface contains indicia thereon.

32. The laminated substantially waterproof mat of claim 29, wherein said mat has a length defined by a distance between said first mat end and said second mat end;

wherein said flap forms said first mat end;

wherein said flap second surface is positioned to overlap said mat exterior when said mat is in a rolled or folded condition, and wherein said mating surface of hooks or loops provided on a location on one of said waterproof or water resistant layer exterior surface or said textile layer exterior surface is disposed at distance from said first mat end, so that when the mat is rolled or folded to a rolled or folded condition, said mating surface of hooks or loops aligns in an engaging relationship with said first surface of hooks or loops provided on said flap second surface.

33. The laminated substantially waterproof mat of claim 32, wherein said second mat end is folded over a plurality of times until the flap of said first mat end engages said mating surface of hooks or loops.

34. The laminated substantially waterproof mat of claim 6, wherein said mat has a length defined by a distance between said first mat end and said second mat end;

wherein said flap forms said first mat end;

wherein said flap second surface is positioned to overlap said mat exterior when said mat is in a rolled or folded condition, wherein said mating surface of hooks or loops provided on a location on one of said waterproof or water resistant layer exterior surface or said textile layer exterior surface is disposed at distance from said first mat end, so that when the mat is rolled or folded to a rolled or folded condition, said mating surface of hooks or loops aligns in an engaging relationship with said first surface of hooks or loops provided on said flap second surface and wherein said one of said waterproof or water resistant layer exterior surface or said textile layer exterior surface on which said mating surface of hooks or loops is provided is free of said handle.

35. The laminated substantially waterproof mat of claim 34, wherein said second mat end is rolled or folded over a plurality of times until the flap of said first mat end engages said mating surface of hooks or loops.

* * * * *